United States Patent [19]
Matsui

[11] 4,146,076
[45] Mar. 27, 1979

[54] TIRE-SLIP PREVENTING DEVICE

[75] Inventor: Kazuhiro Matsui, 1834-4 Uarogama, Zengo-Cho, Aichi-ken, Japan

[73] Assignees: Masaharu Hatamura, Nagoya; Kazuhiro Matsui, Toyoake, both of Japan

[21] Appl. No.: 850,748

[22] Filed: Nov. 11, 1977

[30] Foreign Application Priority Data

Nov. 14, 1976 [JP] Japan ............................ 51-152672[U]

[51] Int. Cl.² ............................................. B60C 27/20
[52] U.S. Cl. ..................................... 152/221; 152/231
[58] Field of Search ................. 152/208, 221–245, 152/213 A, 213 R; D12/154

[56] References Cited
U.S. PATENT DOCUMENTS

| | | | |
|---|---|---|---|
| 2,431,981 | 12/1947 | Ashbury | 152/221 |
| 2,770,281 | 11/1956 | Eddy | D12/154 |
| 3,053,303 | 9/1962 | Donato | 152/241 |
| 3,752,204 | 8/1973 | Ouellette | 152/213 A |
| 3,794,094 | 2/1974 | Wosser, Jr. | 152/213 R |

Primary Examiner—Francis S. Husar
Assistant Examiner—D. W. Underwood
Attorney, Agent, or Firm—Griffin, Branigan and Butler

[57] ABSTRACT

A tire-slip preventing device or "chain" for a vehicle tire comprise a ladder-like arrangement of cross belts attached to two parallel cords. The belts and cords are made from an easily deformable material so that the device may be wrapped around a tire. Rotatable discs are mounted at each end of each cross belt between the cross belts and the side walls of the tire to reduce wear on the side walls as the belts move relative thereto. The cross belts may be permanently attached to both parallel cords, or permanently attached at one end to one cord and detachably attached at the other end to the other cord.

7 Claims, 14 Drawing Figures

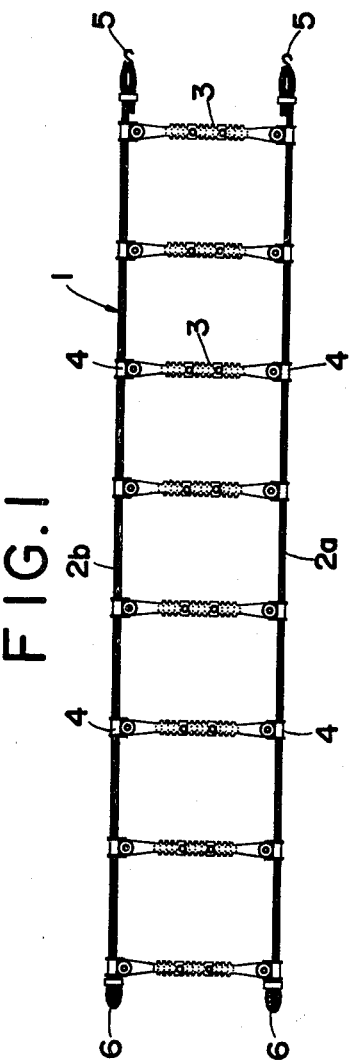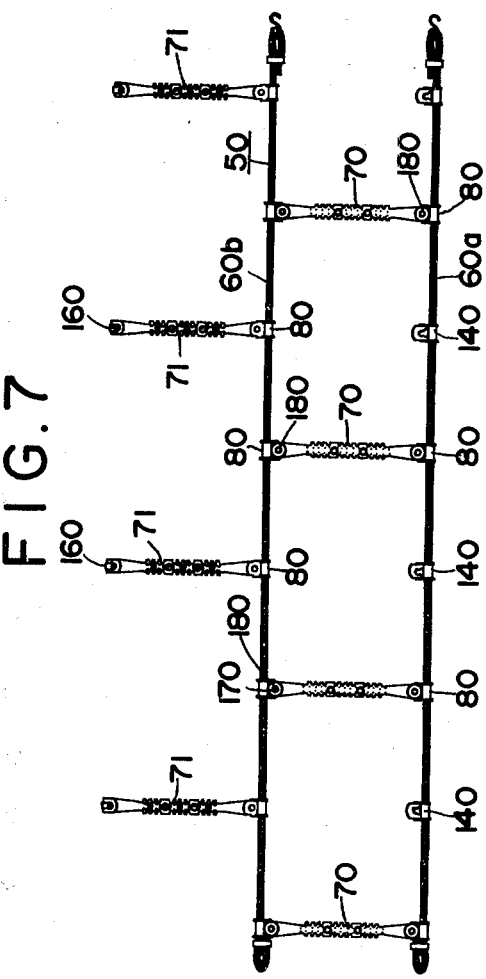

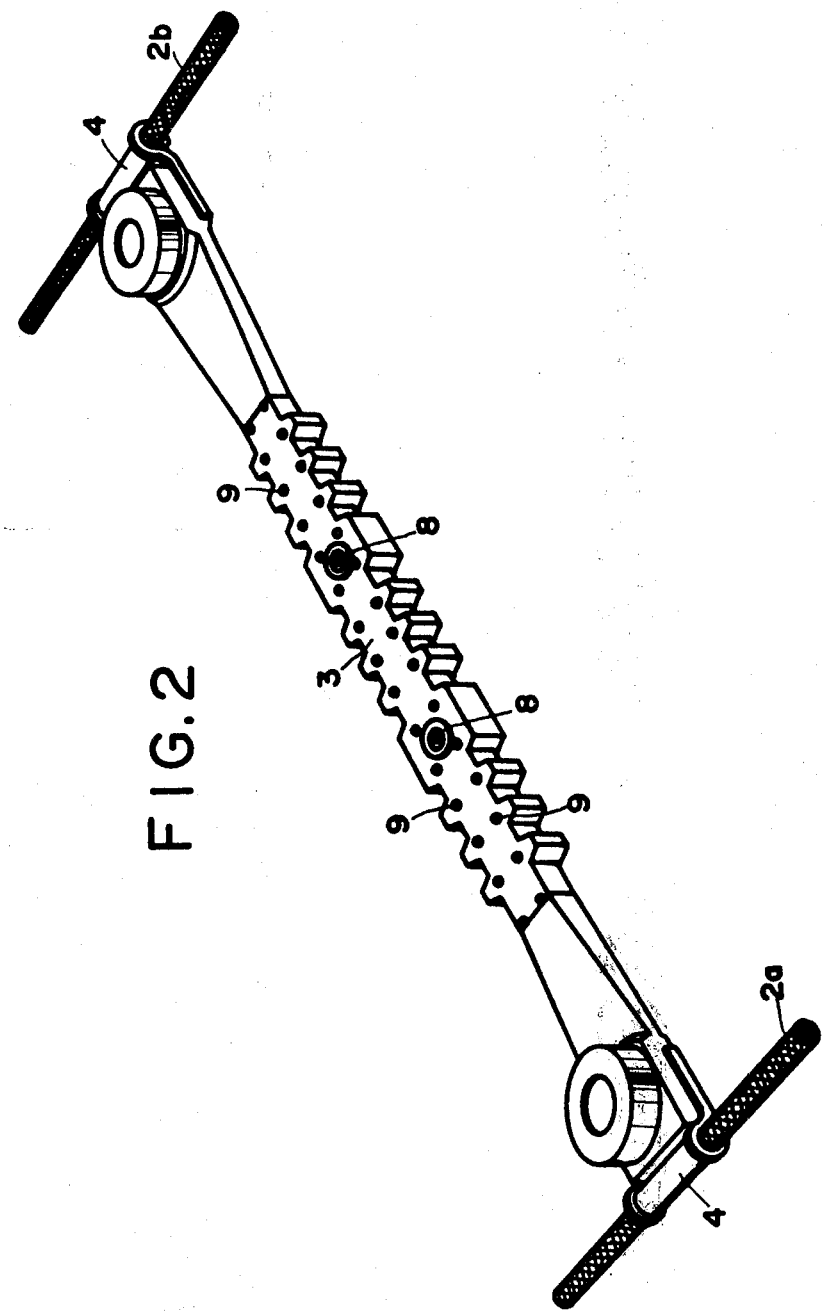

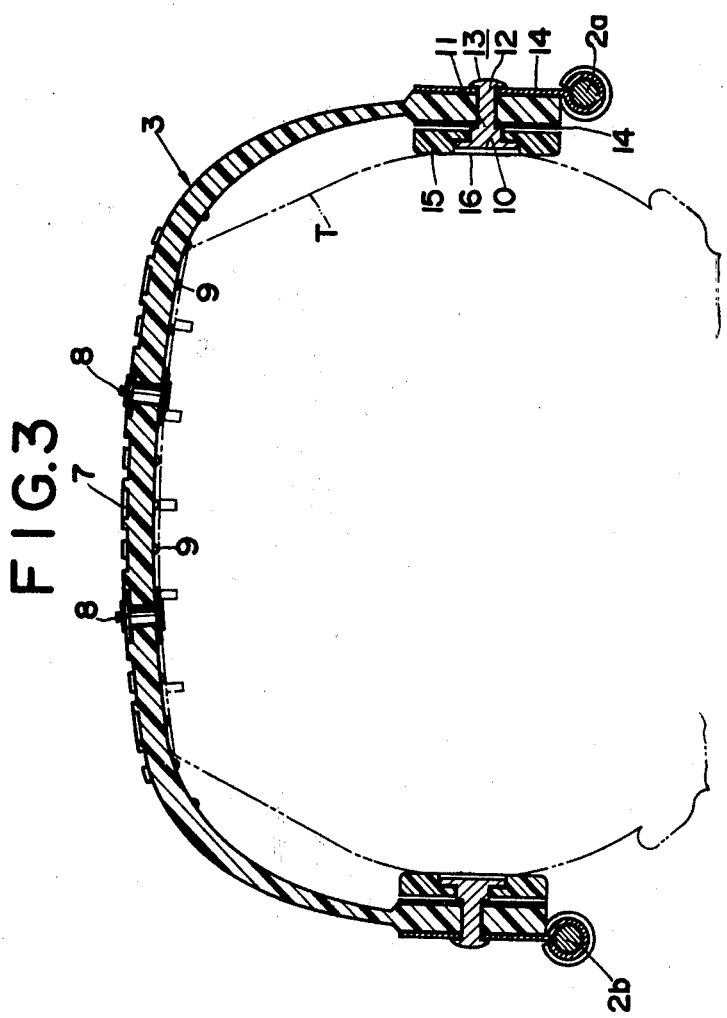

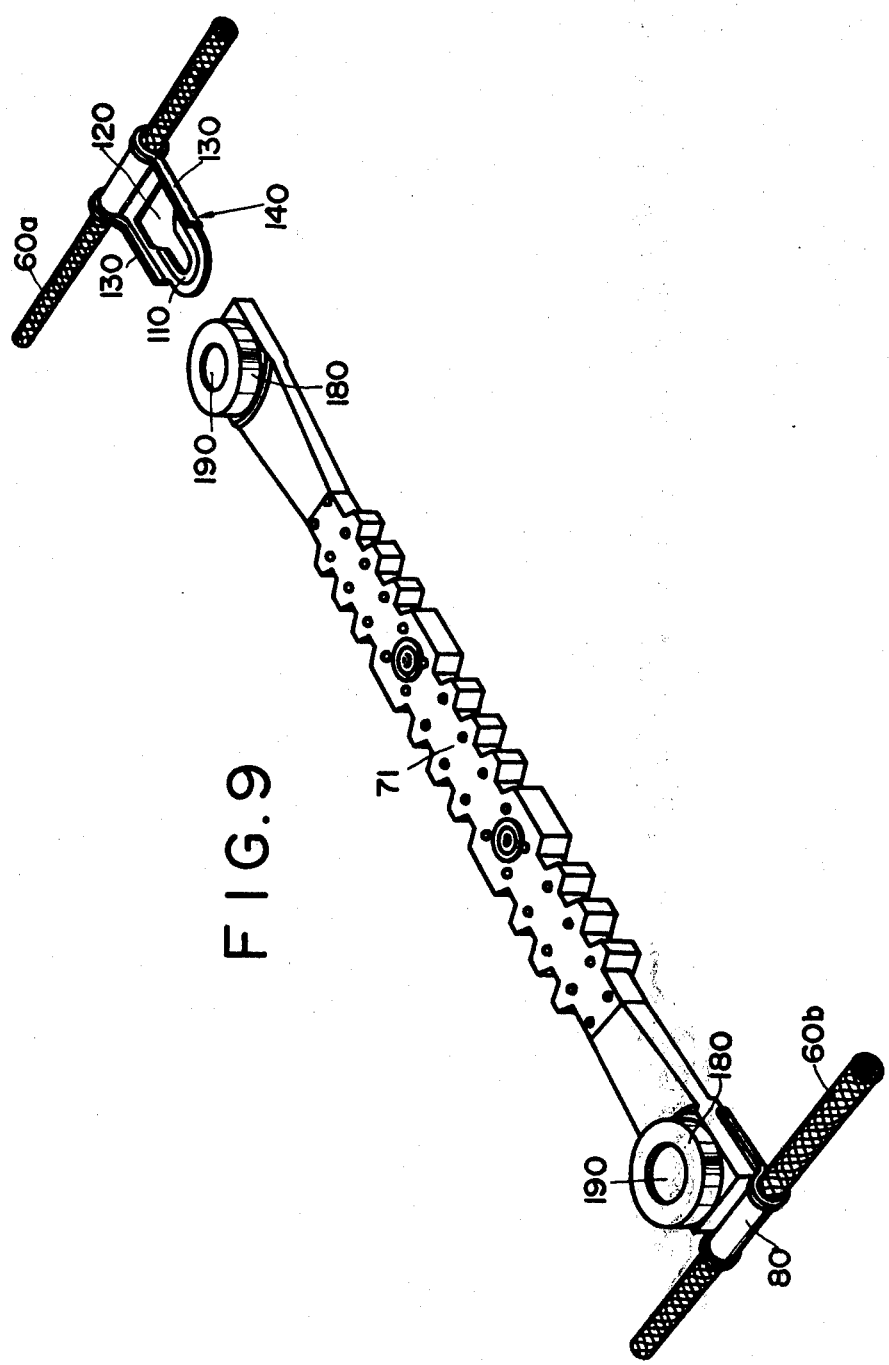

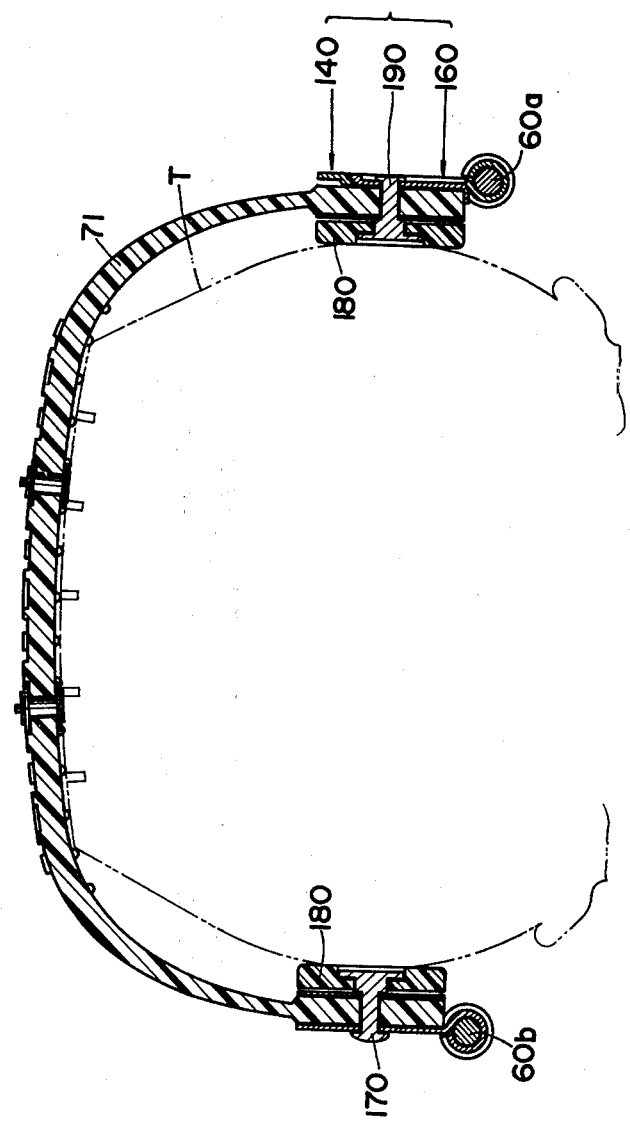

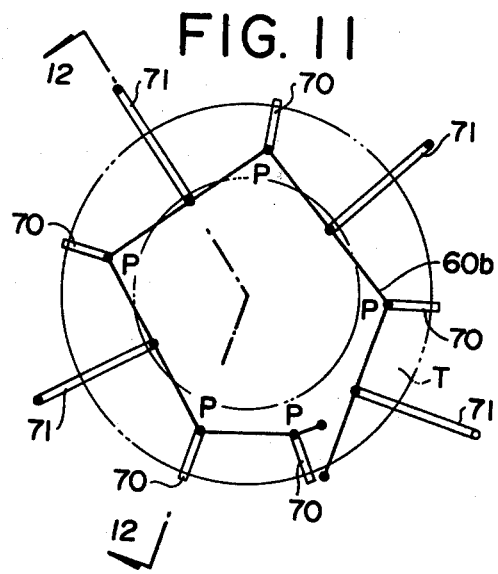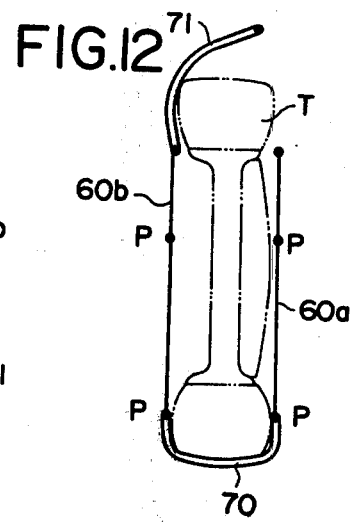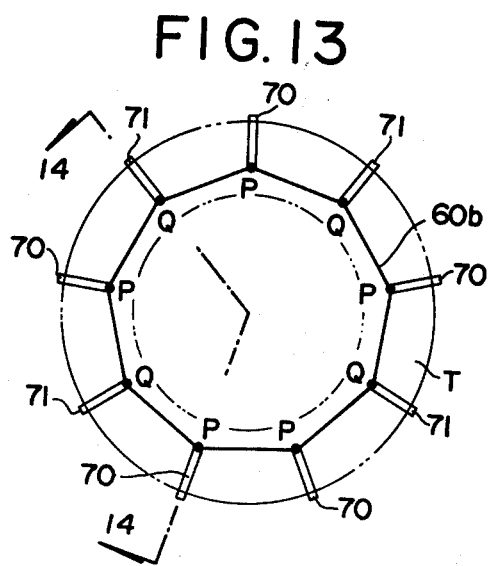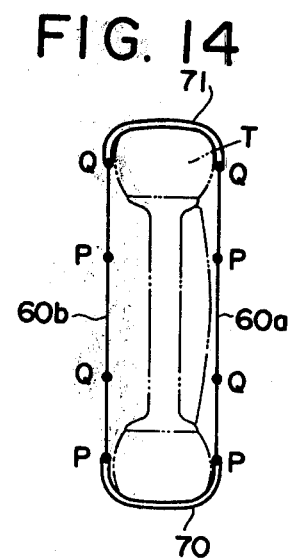

TIRE-SLIP PREVENTING DEVICE

BACKGROUND OF THE INVENTION

This invention relates to a tire-slip preventing device and more particularly to a tire-slip preventing device for preventing the tires of a car from slipping on an icy, snowy or muddy road.

For many years, tire-slip preventing devices made of chains have been available on the market. These devices employ a ladder-like arrangement of chains together with a fastening means for connecting one end of each "side" of the ladder to the other end of the same side, after the device has been wrapped around the periphery of a tire.

There has recently been proposed a tire-slip preventing device which generally comprises two opposed parallel cords and a plurality of cross belts all made from synthetic resin or some other tough but easily deformable material. The cross belts are connected laterally to the cords at the two ends by a suitable fastening and rivet means so that when the device is laid out in a plane it has the form of a ladder, just as the well-known "chains". Each cord is provided with connecting means at the two ends, to be coupled and linked with each other after the device has been wrapped about a tire.

The recently proposed tire-slip preventing device has numerous advantages over the old tire chain made of metal. It is light, easy to carry, and rust-proof. It has the advantage of causing much less damage to the road surface over which the vehicle travels. Furthermore, when the vehicle travels, noise from the device is remarkably less than for the chain device. Nevertheless, it has an important drawback in that the side walls of the tire are inevitably damaged by the end portions of the cross belts when the device is mounted on a vehicle tire and the vehicle is driven to rotate the tire. The cross belts are connected with the cords and are disposed at substantially equal distances around the periphery of the tire, with the two end portions of the respective cross belts being deformably folded and closely held against the side walls of the tire. Thus, when the tire carrying the device is rotated, sliding forces are exerted by the middle portion of the cross belts on the tread portion of the tire every time a cross belt engages the ground. This causes the two end portions of the cross belts to conduct swing and follow movements against the side walls of the tire against which they are fairly tightly held, thereby causing excessive frictional damage to the side walls of the tire. In an extreme case bursting the tire may occur.

SUMMARY OF THE INVENTION

An object of the present invention is to provide a tire-slip preventing device which causes less damage to the side walls of the tire than tire-slip preventing devices of the prior art. According to the present invention, this object is achieved by providing cross belts having a free rollable rotor at the two inner end portions, so that when the present device is mounted on the tire, the two inner end portions of the cross belts are not in direct engagement with the side walls of the tire but are attached to the rotors which engage the side walls. As a result, even though swing and follow movements occur in the two end portions of the cross belts, the swing movement is harmonized relative to the rotor and the follow movement is gone with the revolution of the rotor to moderate excessive friction against the side walls of the tire.

Another object of this invention is to provide a tire-slip preventing device having the advantages described above, and which is easier to mount on a tire than the prior art devices known. Installation is facilitated by making one end of selected ones of the cross belts detachable from at least one of the two parallel cords. This gives greater freedom of movement of the device as it is positioned on a tire. After the device is in position the detachable ends are connected to the parallel cords from which they are detachable, thereby securing the device in place on the tire.

Other objects, features and advantages of the present invention will become apparent upon consideration of the following detailed description of preferred embodiments thereof taken in conjunction with the accompanying drawings.

BRIEF DESCRIPTION OF THE DRAWINGS

FIG. 1 is a plan view of a first embodiment of the present invention, as seen from the tire engaging side;

FIG. 2 is a perspective view of a cross belt and two broken-away cords connected therewith;

FIG. 3 is a lateral section view of the first embodiment mounted on a tire;

FIG. 7 is a plan view of a second embodiment of the present invention;

FIG. 9 is a similar view to FIG. 8 but seen from the tire engaging side;

FIG. 10 is a lateral section view of the second embodiment mounted on a tire;

FIG. 11 shows one intermediate stage in the operation of mounting the second embodiment on a tire;

FIG. 12 is a sectional view taken along line 12—12 in FIG. 11;

FIG. 13 shows the second embodiment completely mounted on the tire; and,

FIG. 14 is a sectional view taken along line 14-14 in FIG. 13.

DESCRIPTION OF THE PREFERRED EMBODIMENTS

Figure 6:
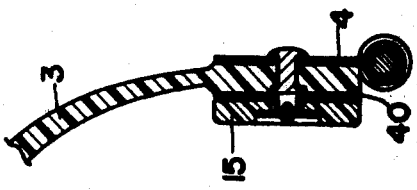
FIG. 6 is a partial section view showing still another rotor mounting means.

Referring to FIGS. 1-6, the tire-slip preventing device 1 in accordance with a first embodiment of the present invention comprises a pair of parallel cords 2a and 2b, and a plurality of cross belts 3 molded of synthetic resin or other strong, wear-resistant and yieldingly deformable material. The cords 2a and 2b have a plurality of metal connectors or clamps 4 secured thereon at equal distances. The two ends of cross belts 3 are riveted to clamps 4. As best shown in FIG. 1, the present device 1 is in the form of a ladder when it is extended in a plane. The two cords 2a and 2b have a hook 5 at one end and a loop 6 at the other end. Hooks 5 and loops 6 comprises fastening means which, when connected together and mounted on a tire T, cause cords 2a and 2b to form two closed rings. The outer and middle portion (ground engaging side) of cross belts 3 is provided with proper tread patterns 7 and spikes or studs 8. The inner and middle portion (tire engaging side) of cross belts 3 is provided with a plurality of wart-like projections 9 so as to be frictionally fitted in the tread surface of tire T.

In accordance with the present invention, the tire-slip preventing device is provided with a plurality of rotor discs 15. The rotor discs 15 are made from a rigid synthetic resin or metal and have a composite through-hole 16 having a major bore portion and minor bore portion co-axially provided as best shown in FIG. 3. A rotor mounting means as shown in FIG. 3 comprises a double journalled rivet 13 having a head portion 10, a major stem portion 11 and a minor stem portion 12. A rivet 13 is passed through the composite hole 16 of each rotor 15 to have the head portion 10 and major stem portion 11 loosely fitted therein, so that each rotor disc 15 is free to rotate on its associated rivet 13. A sheet or plate 14 is provided adjacent to each inner end portion of each cross belt 3. Sheets 14 are made from copper, iron or other metal to reduce friction, and are held in place by rivets 13. The head portion 10 of rivet 13 is accommodated in the major bore portion of composite hole 16 of rotor disc 15 and does not project out of the surface of rotor disc 15. The minor stem portion 12 of rivet 13 is passed through the end portion of cross belt 3 and metal connector 4 to the rivet head. The flattened head of rivet 13 together with the major stem portion 11 secure the antifriction sheet 14, the end portion of cross belt 3, and connecting metal 4, together.

As shown in FIG. 3, when the present device 1 is mounted on tire T, the two end portions of cross belts 3 are folded inwardly and toward the side walls of tire T by tightening the respective ends of cords 2a and 2b so that the surface of rotor discs 15 may be brought under pressure into engagement with the side walls of tire T. With rotation of tire T, the swing and follow movements of the two end portions of cross belts 3 may occur but these movements will not damage the side walls of tire T because rotor discs 15 are free to rotate over the surface of the side wall.

Figure 4:
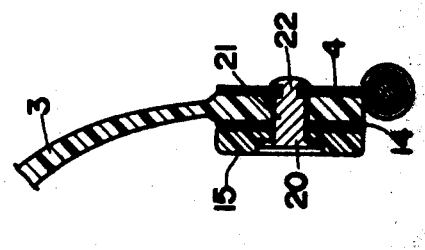
FIG. 4 is a partial section view showing another rotor mounting means according to the present invention.

The rotor mounting means shown in FIG. 4 comprises a modified rivet 20 having a head portion, a major stem portion 21 and a minor stem portion 22. The minor stem portion 22 alone of rivets 20 is passed through metal connector 4 to extend outwardly. The extended portion of rivets 20 is then flattened to lock metal connector 4 and secure it to the end portion of cross belt 3 together. Antifriction sheets 14 may be interposed as shown.

Figure 5:
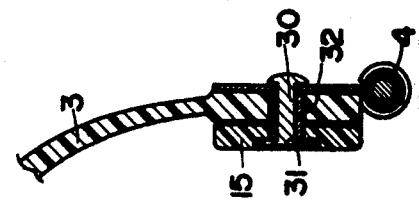
FIG. 5 is a partial section view showing a further rotor mounting means.

The rotor mounting means shown in FIG. 5 comprises a rivet 30 in general form having head portion 31. A collar 32 is provided around rivet 30 so that rotor disc 15 is free to rotate.

The rotor mounting means shown in FIG. 6 comprises a fixture base 40 which is secured to the inner end portion of cross belts 3 by adhesive or other fastening means. The end portions of cross belts 3 are riveted to metal connectors 4 by conventional means. In this manner, rotor discs 15 can be readily attached to the cross belts of the prior art without further modification of the belts.

Figure 8:
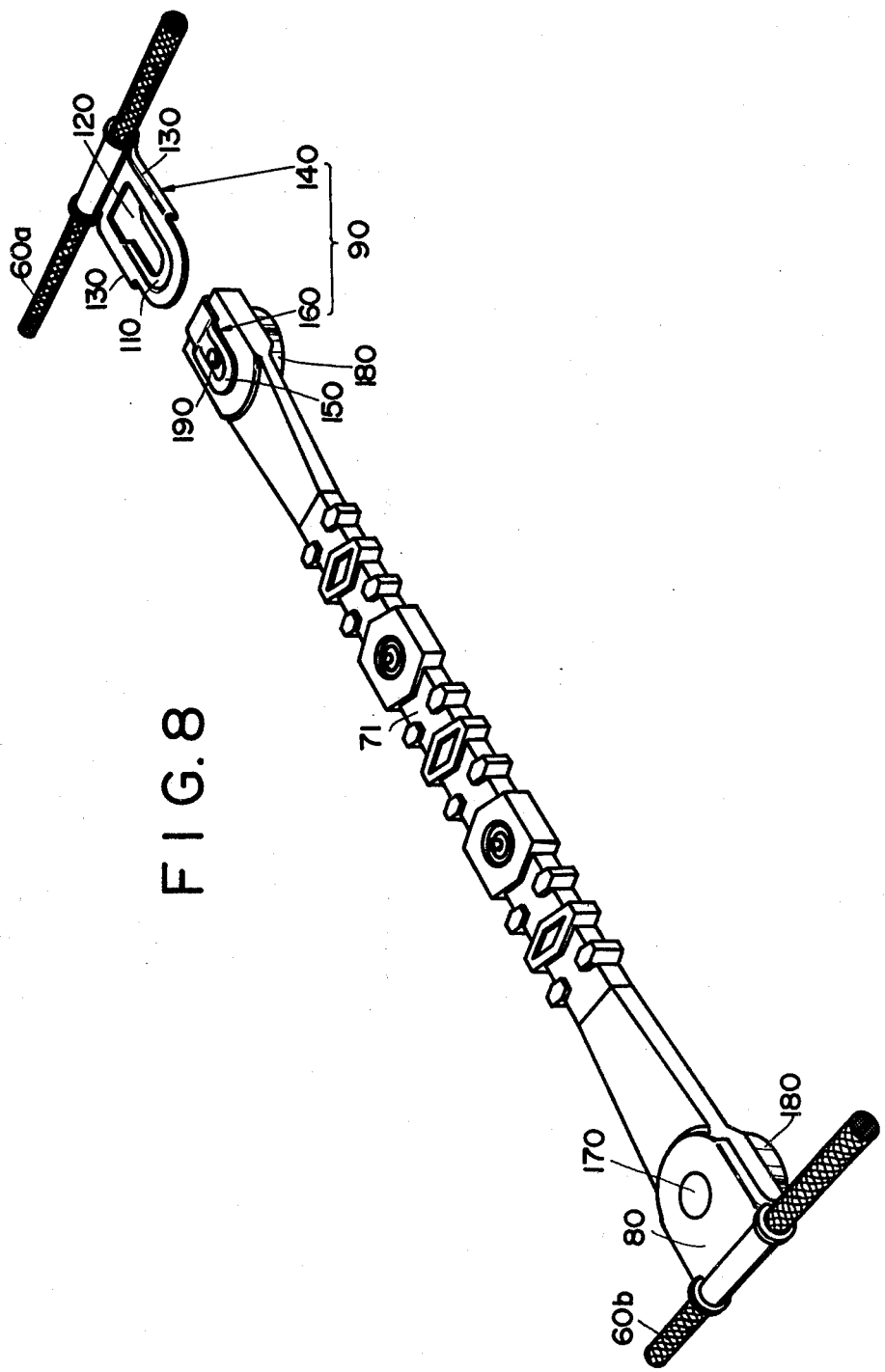
FIG. 8 is a perspective view of a detachable cross belt and two broken-away cords in combination therewith as seen from the ground engaging side.

The device shown in FIG. 7-10 is a second embodiment of the present invention and comprises a plurality of cross belts 71 having one end permanently connected with one side cord 60b and the other end detachably connected with the other side cord 60a. The device comprises further cross belts 70 having the two ends permanently connected with respective two cords 60a and 60b. Cross belts 70 are constructed in the same manner as in the first embodiment and are provided with a metal connector 80 at the two ends. Cross belts 70 are permanently connected with the corresponding cords 60a and 60b in a parallel relation with each other and in lateral relation to said cords by metal connectors 80. As shown in FIG. 8, cross belts 71 are permanently connected with cord 60b at one end by means of metal connectors 80 but are detachably connected with cord 60a at the other end by means of a joint assembly 90. Joint assembly 90, as shown, comprises a female metal member 140 secured to cord 60a and a male metal member 160 at the end of cross belt 71. Female metal member 140 is shield-shaped and has a removed opening 120, a U-shaped and depressed portion 110 provided therealong, and two side guide edges 130. Male metal member 160 is configured complementary to the removed opening 120 of female metal member 140. Member 160 is inserted in opening 120 and guided along guide edges 130 with a sliding motion until it is caught by depressed portion 110 of female metal member 140. Male metal member 160 has a bent-back hook which consists of a raised portion 150 along the outer and U-shaped periphery so as to fit in depressed portion 110 of female metal member 140. With this arrangement, male and female metal members 160 and 140 allow one end of cross belts 71 to be detachably engaged with cord 60a. As for cross belts 70 which two ends are permanently connected with cords 60a, 60b, the two inner end portions are each provided with a rotor disc 180 which is free to rotate and has the same construction as in the embodiment of FIG. 1. The one end portion, of detachable cross belts 71 which is permanently connected with cord 60b is likewise provided with a rotor disc 180. The other end portion of each cross belt 70 is detachably connected with cord 60a is further provided with a rotor disc 180 but the mounting is accomplished by passing the extended portion of a journalled rivet 190 through male metal member 160 and securing it by flattening the head.

In mounting the present device on a tire, male metal member 160 of cross belts 71 at one end of the ladder are detached from female metal members 140 of cord 60a, so that said one end of the ladder is opened, as shown in FIG. 7. Subsequently, cord 60b and all cross belts 71 together are placed behind tire T, and all cross belts 70 are wound around the ground engaging and peripheral surface of tire T. The two ends of respective cords 60a and 60b are then pulled together end-wise and linked with each other by means of hooks 5 and loops 6. As a result, cross belts 71 cause the two cords 60a and 60b to form corresponding polygons having angle points P as shown in FIG. 11. Next, the free end portions of cross belts 71 are folded in front of tire T; pulled toward cord 60a in the region of the mid-point between one angle point P and the adjacent point P; and then connected with cord 60a by means of the members 140 and 160. In this manner, cross belts 71 are tightly connected with cord 60a, so that two cords 60a and 60b are increasingly stretched to add angle points Q as shown in FIG. 13. At the same time, the inner end portions of all cross belts 70, 71 are drawn close to the side walls of tire T, as shown in FIG. 14.

As is evident from the foregoing description, the present device can be readily mounted on a tire by simple labor.

While preferred embodiments have been described in specific detail, it should be understood that various modifications and substitutions may be made therein without departing from the spirit and scope of the invention as defined by the appended claims.

The embodiments of the invention in which an exclusive property or privilege is claimed are defined as follows:

1. In a tire-slip preventing device for mounting on a vehicle wheel and including two opposed, parallel cords and a plurality of cross belts connected laterally to said cords in the form of a ladder, each cross belt being made of a yieldingly deformable and resilient material, the improvement comprising:
   a plurality of freely rotatable discs, and means for rotatably mounting one of said discs at each end of each cross belt;
   each disc being interposed between a side wall of said tire and said cross belt to which said disc is attached so as to have an axis of rotation substantially normal to the longitudinal axis of said belt and said side wall when said tire-slip preventing device is mounted on said tire; and
   said discs being of sufficient thickness to prevent said cross belts from contacting said side walls of said tire.

2. The improvement as set forth in claim 1, wherein said means for attaching said discs comprises:
   connectors adapted to fasten each end of said cross belts to said cords;
   said connectors being fastened to said cross belts by a rivet means which extends through said cross belts and rotatably fastens said discs to said cross belts.

3. The improvement according to claim 1 and further comprising an antifriction means interposed between each of said discs and said cross belt to which each of said discs is attached.

4. The improvement according to claim 2 and further comprising an antifriction means interposed between each of said discs and said cross belt to which each of said discs is attached.

5. The improvement according to claim 1 wherein said connectors, adapted to fasten each end of said cross belts to said cords, are attached to said belts by a rivet means; and
   said discs are rotatably attached to said cross belts by a fixture base adapted to be secured to said cross belts by an adhesive means.

6. A tire-slip preventing device for mounting on a vehicle wheel and including two opposed, parallel cords and a plurality of cross belts connected laterally to said cords in the form of a ladder, each cross belt being made of a yieldingly deformable and resilient material, the improvement comprising:
   a plurality of freely rotatable discs and means for rotatably mounting one of said discs at each end of each cross belt;
   each disc being interposed between a side wall of said tire and said cross belt to which said disc is attached so as to have an axis of rotation substantially normal to the longitudinal axis of said belt and said side wall when said tire-slip preventing device is mounted on said tire;
   said discs being of sufficient thickness to prevent said cross belts from contacting said side walls of said tires;
   said means for rotatably mounting said discs including connectors adapted to fasten said cross belts to said cords; and
   said connectors being adapted to detachably connect said belts to said cords.

7. The improvement according to claim 6 and further comprising an antifriction means interposed between each of said discs and said cross belts to which said discs are attached.

* * * * *